United States Patent
Fan et al.

(10) Patent No.: US 12,409,580 B1
(45) Date of Patent: Sep. 9, 2025

(54) CONTINUOUS FIBER CURING EXTRUSION DEVICE BASED ON ADDITIVE MANUFACTURING CERAMIC COMPOSITES

(71) Applicant: NANJING UNIVERSITY OF AERONAUTICS AND ASTRONAUTICS, Nanjing (CN)

(72) Inventors: Congze Fan, Nanjing (CN); Zhongde Shan, Nanjing (CN); Wenzhe Song, Nanjing (CN); Jinghua Zheng, Nanjing (CN); Yiwei Chen, Nanjing (CN); Zhibo Li, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 19/221,567

(22) Filed: May 29, 2025

Related U.S. Application Data

(63) Continuation of application No. PCT/CN2025/071942, filed on Jan. 13, 2025.

(30) Foreign Application Priority Data

Jun. 18, 2024 (CN) .......................... 202410784244.7

(51) Int. Cl.
  *B28B 1/00* (2006.01)
  *B28B 23/02* (2006.01)
  *B33Y 30/00* (2015.01)

(52) U.S. Cl.
  CPC .............. *B28B 1/001* (2013.01); *B28B 23/02* (2013.01); *B33Y 30/00* (2014.12)

(58) Field of Classification Search
  None
  See application file for complete search history.

(56) References Cited

U.S. PATENT DOCUMENTS

2003/0044593 A1  3/2003  Vaidyanathan et al.

FOREIGN PATENT DOCUMENTS

| CN | 105579220 A |   | 5/2016 |   |           |
|----|-------------|---|--------|---|-----------|
| CN | 108858660 A |   | 11/2018|   |           |
| CN | 111069603 A |   | 4/2020 |   |           |
| CN | 111300813 A | * | 6/2020 | ..........| B29C 64/314 |

(Continued)

*Primary Examiner* — Susan D Leong
*Assistant Examiner* — Xinwen Ye
(74) *Attorney, Agent, or Firm* — Bayramoglu Law Offices LLC

(57) ABSTRACT

A continuous fiber curing extrusion device based on additive manufacturing ceramic composites includes a main support frame. A top inner wall of the main support frame is simultaneously mounted with a first guide rail, a second guide rail, and a third guide rail. The first guide rail is parallel to the second guide rail, the second guide rail is perpendicular to the third guide rail, a ceramic flux extrusion gun is movably connected to the first guide rail, and a bottom end of the ceramic flux extrusion gun is provided with a segmentation mechanism. One end of the ceramic flux extrusion gun is connected to a ceramic flux storage bin through a first connecting pipe, and a first fiber flux extrusion gun and a second fiber flux extrusion gun are movably connected to the second guide rail and the third guide rail respectively.

8 Claims, 4 Drawing Sheets

(56) References Cited

FOREIGN PATENT DOCUMENTS

| | | | | |
|---|---|---|---|---|
| CN | 111805687 A | | 10/2020 | |
| CN | 115384059 A | * | 11/2022 | ............. B29C 35/16 |
| CN | 115570648 A | | 1/2023 | |
| CN | 116571758 A | | 8/2023 | |
| CN | 118478430 A | | 8/2024 | |
| KR | 101936916 B1 | | 1/2019 | |

* cited by examiner

CONTINUOUS FIBER CURING EXTRUSION DEVICE BASED ON ADDITIVE MANUFACTURING CERAMIC COMPOSITES

CROSS REFERENCE TO THE RELATED APPLICATIONS

This application is a continuation application of International Application No. PCT/CN2025/071942, filed on Jan. 13, 2025, which is based upon and claims priority to Chinese Patent Application No. 202410784244.7, filed on Jun. 18, 2024, the entire contents of which are incorporated herein by reference.

TECHNICAL FIELD

The present invention relates to the technical field of additive manufacturing, in particular to a continuous fiber curing extrusion device based on additive manufacturing ceramic composites.

BACKGROUND

Ceramic matrix composites are a type of composite materials composed of ceramics as a matrix and various fibers. The ceramic matrix may be high-temperature structural ceramics such as silicon nitride and silicon carbide. These advanced ceramics have excellent properties such as high-temperature resistance, high strength and stiffness, relatively light weight, and corrosion resistance, while their fatal weakness is their brittleness, which can cause cracks and even fracture when under stress, resulting in material failure.

The use of high-strength and high-elasticity fiber and matrix composites is an effective way to improve the toughness and reliability of ceramics. Fibers can prevent the propagation of cracks, thereby obtaining fiber-reinforced ceramic matrix composites with excellent toughness. Ceramic matrix composites have been used in liquid rocket engine nozzles, missile antenna covers, space shuttle nose cones, aircraft brake discs, high-end automotive brake discs, etc., becoming an important branch of high-tech new materials.

However, fiber layers in ceramic matrix composites, mostly arranged in single layers with insufficient toughness and stability, are generally extruded with a single extrusion gun for staggered arrangement, affecting the extrusion efficiency.

SUMMARY

The present invention discloses a continuous fiber curing extrusion device based on additive manufacturing ceramic composites, aiming to solve the technical problem that the extrusion efficiency of fiber layers in ceramic matrix composites, mostly arranged in single layers with insufficient toughness and stability, is affected when extruded with a single extrusion gun for staggered arrangement.

To achieve the above objective, the present invention employs the following technical solution:

A continuous fiber curing extrusion device based on additive manufacturing ceramic composites includes a main support frame, where a top inner wall of the main support frame is simultaneously mounted with a first guide rail, a second guide rail, and a third guide rail, where the first guide rail is parallel to the second guide rail, the second guide rail is perpendicular to the third guide rail, a ceramic flux extrusion gun is movably connected to the first guide rail, and a bottom end of the ceramic flux extrusion gun is provided with a segmentation mechanism; one end of the ceramic flux extrusion gun is connected to a ceramic flux storage bin through a first connecting pipe, and a first fiber flux extrusion gun and a second fiber flux extrusion gun are movably connected to the second guide rail and the third guide rail and simultaneously connected to a fiber flux storage bin through second connecting pipes respectively; a second transverse guide rail is fixed to a bottom inner wall of the main support frame, a longitudinal guide rail is movably connected to the second transverse guide rail, a first transverse guide rail is movably connected to the longitudinal guide rail, a base is movably connected to the first transverse guide rail, and a cooling mechanism is arranged around an outer side of the base.

The two fiber flux extrusion guns are arranged with vertical operating paths and placed in an area separately from the ceramic flux extrusion gun used for extruding a ceramic flux, the second transverse guide rail drives the base to switch between two areas, and the first transverse guide rail and the longitudinal guide rail drive the base to assist in the extrusion of a fiber flux or the ceramic flux. Therefore, by planning an operating path, a layer-by-layer stacked fiber mesh can be formed on ceramic flux layers through longitudinal and transverse alternate extrusion of fibers after each layer of ceramic flux is stacked, and the fiber mesh is further covered with a ceramic flux layer to form a ceramic matrix composite, which can enhance the stability and toughness of fiber layers in the ceramic matrix composite and effectively improve the extrusion efficiency of fibers compared with fibers extruded with a single fiber flux extrusion gun.

In a preferred solution, the segmentation mechanism includes an extrusion port, a bottom end of the extrusion port is movably attached to a support ring, a center position of the support ring is fixedly connected to a segmentation rod, and one side of the support ring is fixedly connected to a bracket; a plurality of second limit insertion rods and a cylinder are fixedly connected to an outer wall of a same side of the bracket, a third support plate is fixedly connected to an outer wall of the extrusion port, and a mounting rack is fixedly connected to a bottom outer wall of the third support plate; a plurality of second limit insertion plates are fixedly connected to the bottom outer wall of the third support plate, the second limit insertion rods are movably inserted into the second limit insertion plates respectively, and the cylinder is fixedly connected into the mounting rack.

The segmentation mechanism is attached to the bottom end of the extrusion port, and the segmentation rod spans the bottom end of the extrusion port, whereby a straight groove is formed at a top of the extruded material in the presence of the segmentation rod during additive manufacturing. When fibers are extruded from the fiber flux storage bin along the straight groove, the fiber mesh is attached to the top of the extruded ceramic flux. When the fiber mesh is covered with the next layer of ceramic flux, the straight groove can assist the fiber mesh in falling down and bonding better with the ceramic flux layer.

In a preferred solution, the cooling mechanism includes a frame, the frame surrounds and is fixed to an outer wall of the base, and a plurality of jet ports penetrate a top end of the frame at equidistant intervals; a plurality of jets are fixedly connected to a bottom end of the frame, output ends of the jets are connected to the plurality of jet ports respectively, and a first support plate and a bearing bracket are fixedly connected to two opposite outer walls of the frame respectively; a plurality of first limit insertion rods are fixed to a top end of the first support plate, a screw is connected into the bearing bracket, and a bottom end of the screw is connected to a step motor; an annular guide bracket is provided at the top of the frame, a first limit insertion plate and a second support plate are fixedly connected to two opposite outer walls of the annular guide bracket respectively, a nut is mounted at a center position of the second support plate, the nut is engaged outside the screw, and the first limit insertion rods are movably inserted into the first limit insertion plate; the annular guide bracket includes a bend, two ends of the bend are provided with an air inlet and an air outlet respectively, and the air inlet corresponds to the plurality of jet ports.

The cooling mechanism can drive the annular guide bracket to move upward according to a real-time manufacturing height through the rotation of the screw. Meanwhile, the jets jet air upward, and the air is guided by the annular guide bracket and discharged from the air outlet to act on an outer surface of a manufactured workpiece for auxiliary cooling. Compared with direct blowing of air for cooling, this structure can avoid damage to an outer wall of the workpiece and ensure the stability of a bottom structure of the workpiece through real-time cooling during additive manufacturing.

As can be seen from the above, a continuous fiber curing extrusion device based on additive manufacturing ceramic composites includes a main support frame, where a top inner wall of the main support frame is simultaneously mounted with a first guide rail, a second guide rail, and a third guide rail, where the first guide rail is parallel to the second guide rail, the second guide rail is perpendicular to the third guide rail, a ceramic flux extrusion gun is movably connected to the first guide rail, and a bottom end of the ceramic flux extrusion gun is provided with a segmentation mechanism; one end of the ceramic flux extrusion gun is connected to a ceramic flux storage bin through a first connecting pipe, and a first fiber flux extrusion gun and a second fiber flux extrusion gun are movably connected to the second guide rail and the third guide rail and simultaneously connected to a fiber flux storage bin through second connecting pipes respectively; a second transverse guide rail is fixed to a bottom inner wall of the main support frame, a longitudinal guide rail is movably connected to the second transverse guide rail, a first transverse guide rail is movably connected to the longitudinal guide rail, a base is movably connected to the first transverse guide rail, and a cooling mechanism is arranged around an outer side of the base. According to the continuous fiber curing extrusion device based on additive manufacturing ceramic composites provided by the present invention, by planning an operating path, a layer-by-layer stacked fiber mesh can be formed on ceramic flux layers through longitudinal and transverse alternate extrusion of fibers after each layer of ceramic flux is stacked, and the fiber mesh is further covered with a ceramic flux layer to form a ceramic matrix composite, which can effectively improve the extrusion efficiency of fibers compared with fibers extruded with a single fiber flux extrusion gun in the prior art and enhance the stability and toughness of fiber layers in the ceramic matrix composite.

LIST OF REFERENCE NUMERALS

1. Main support frame; 2. Ceramic flux storage bin; 3. Fiber flux storage bin; 4. Cooling mechanism; 5. Base; 6. Segmentation mechanism; 7. First connecting pipe; 8. Ceramic flux extrusion gun; 9. First guide rail; 10. Second guide rail; 11. First fiber flux extrusion gun; 12. Third guide rail; 13. Second fiber flux extrusion gun; 14. Second connecting pipe; 15. First transverse guide rail; 16. Longitudinal guide rail; 17. Second transverse guide rail; 401. Bearing bracket; 402. Screw; 403. Frame; 404. Jet nozzle; 405. Jet; 406. First support plate; 407. First limit insertion rod; 408. First limit insertion plate; 409. Annular guide bracket; 410. Second support plate; 411. Nut; 412. Bend; 413. Air inlet; 414. Air outlet; 601. Third support plate; 602. Mounting rack; 603. Cylinder; 604. Second limit insertion plate; 605. Second limit insertion rod; 606. Bracket; 607. Support ring; 608. Segmentation rod; 609. Extrusion port.

DETAILED DESCRIPTION OF THE EMBODIMENTS

The present invention will be further illustrated below in conjunction with the accompanying drawings and specific embodiments. It should be understood that the following specific embodiments are only used for explaining the present invention, rather than limiting the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

Figure 1:
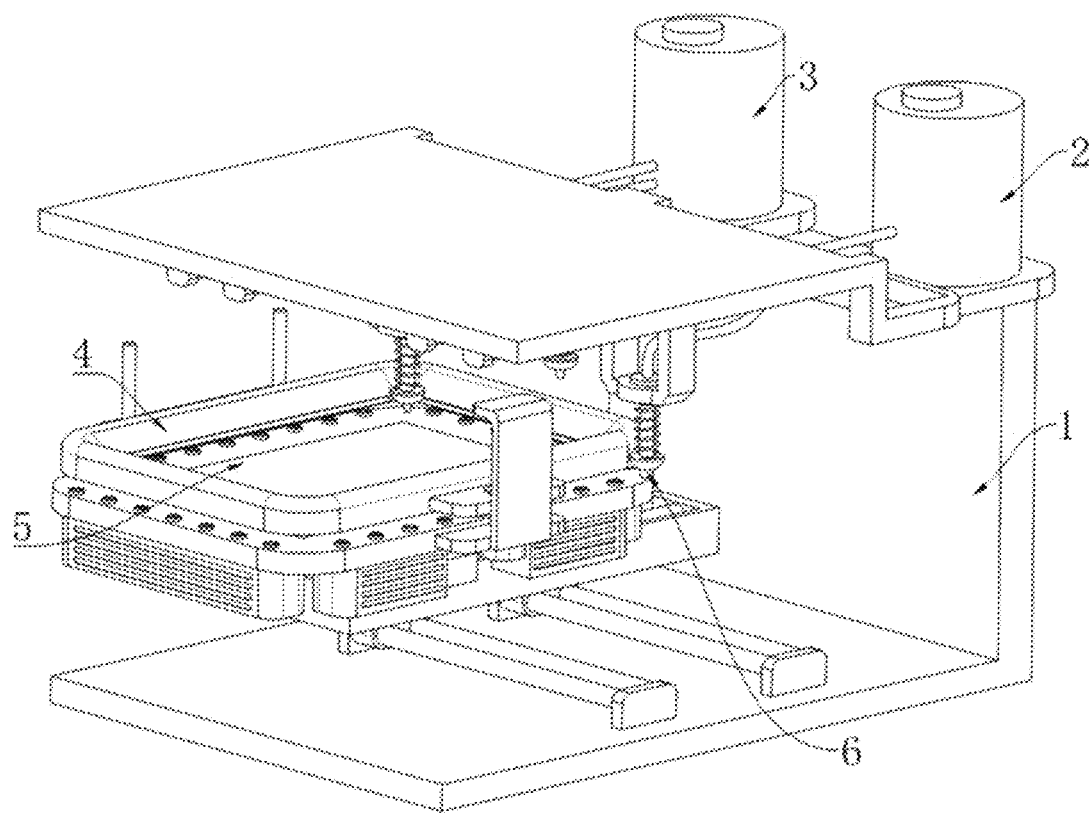
FIG. 1 is a schematic diagram of an overall structure of a continuous fiber curing extrusion device based on additive manufacturing ceramic composites according to the present invention.
Figure 2:
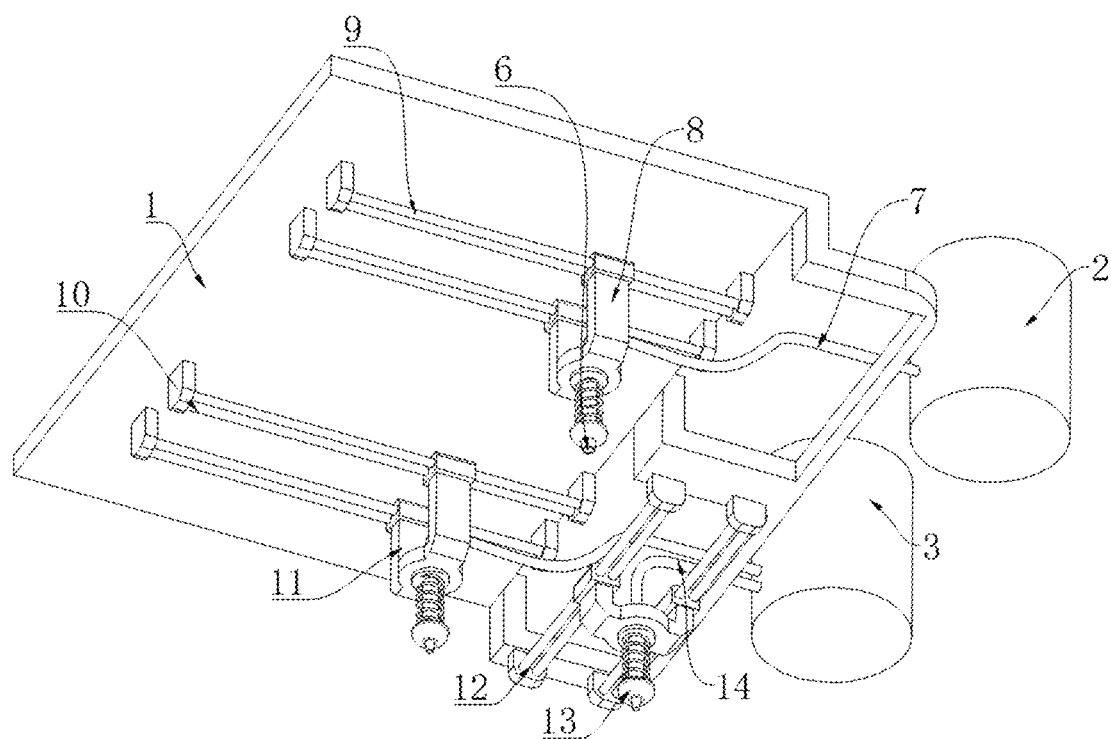
FIG. 2 is a schematic diagram of a top structure of a continuous fiber curing extrusion device based on additive manufacturing ceramic composites according to the present invention.
Figure 3:
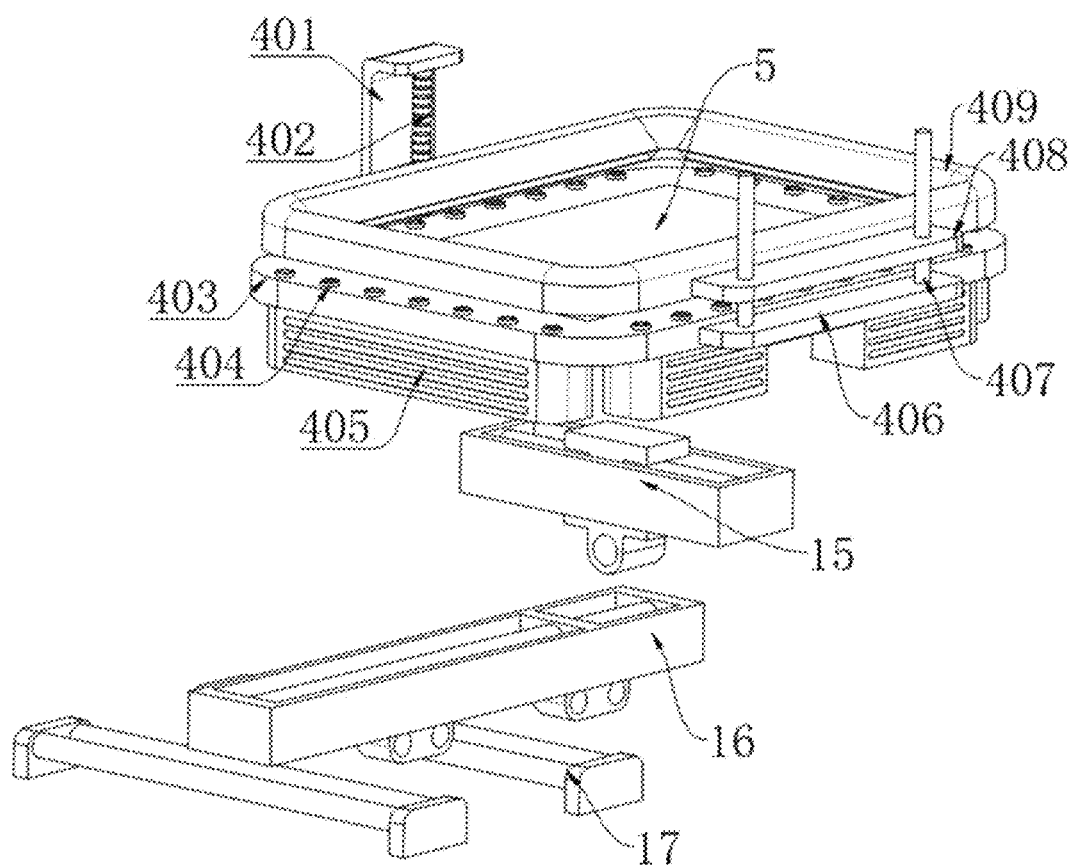
FIG. 3 is a schematic diagram of disassembly of a bottom driving structure of a continuous fiber curing extrusion device based on additive manufacturing ceramic composites according to the present invention.

With reference to FIGS. 1-3, a continuous fiber curing extrusion device based on additive manufacturing ceramic composites in this embodiment includes a main support frame 1; a top inner wall of the main support frame 1 is simultaneously mounted with a first guide rail 9, a second guide rail 10, and a third guide rail 12, where the first guide rail 9 is parallel to the second guide rail 10, the second guide rail 10 is perpendicular to the third guide rail 12, a ceramic flux extrusion gun 8 is movably connected to the first guide rail 9, and a bottom end of the ceramic flux extrusion gun 8 is provided with a segmentation mechanism 6; one end of the ceramic flux extrusion gun 8 is connected to a ceramic flux storage bin 2 through a first connecting pipe 7, and a first fiber flux extrusion gun 11 and a second fiber flux extrusion gun 13 are movably connected to the second guide rail 10 and the third guide rail 12 and simultaneously connected to a fiber flux storage bin 3 through second connecting pipes 14 respectively; a second transverse guide rail 17 is fixed to a bottom inner wall of the main support frame 1, a longitudinal guide rail 16 is movably connected to the second transverse guide rail 17, a first transverse guide rail 15 is movably connected to the longitudinal guide rail 16, a base 5 is movably connected to the first transverse guide rail 15, and a cooling mechanism 4 is arranged around an outer side of the base 5. The two fiber flux extrusion guns are arranged with vertical operating paths and placed in an area separately from the ceramic flux extrusion gun 8 used for extruding a ceramic flux, the second transverse guide rail 17 drives the base 5 to switch between two areas, and the first transverse guide rail 15 and the longitudinal guide rail 16 drive the base 5 to assist in the extrusion of a fiber flux or the ceramic flux. Therefore, by planning an operating path, a layer-by-layer stacked fiber mesh can be formed on ceramic flux layers through longitudinal and transverse alternate extrusion of fibers after each layer of ceramic flux is stacked, and the fiber mesh is further covered with a ceramic flux layer to form a ceramic matrix composite, which can enhance the stability and toughness of fiber layers in the ceramic matrix composite and effectively improve the extrusion efficiency of fibers compared with fibers extruded with a single fiber flux extrusion gun.

Figure 6:
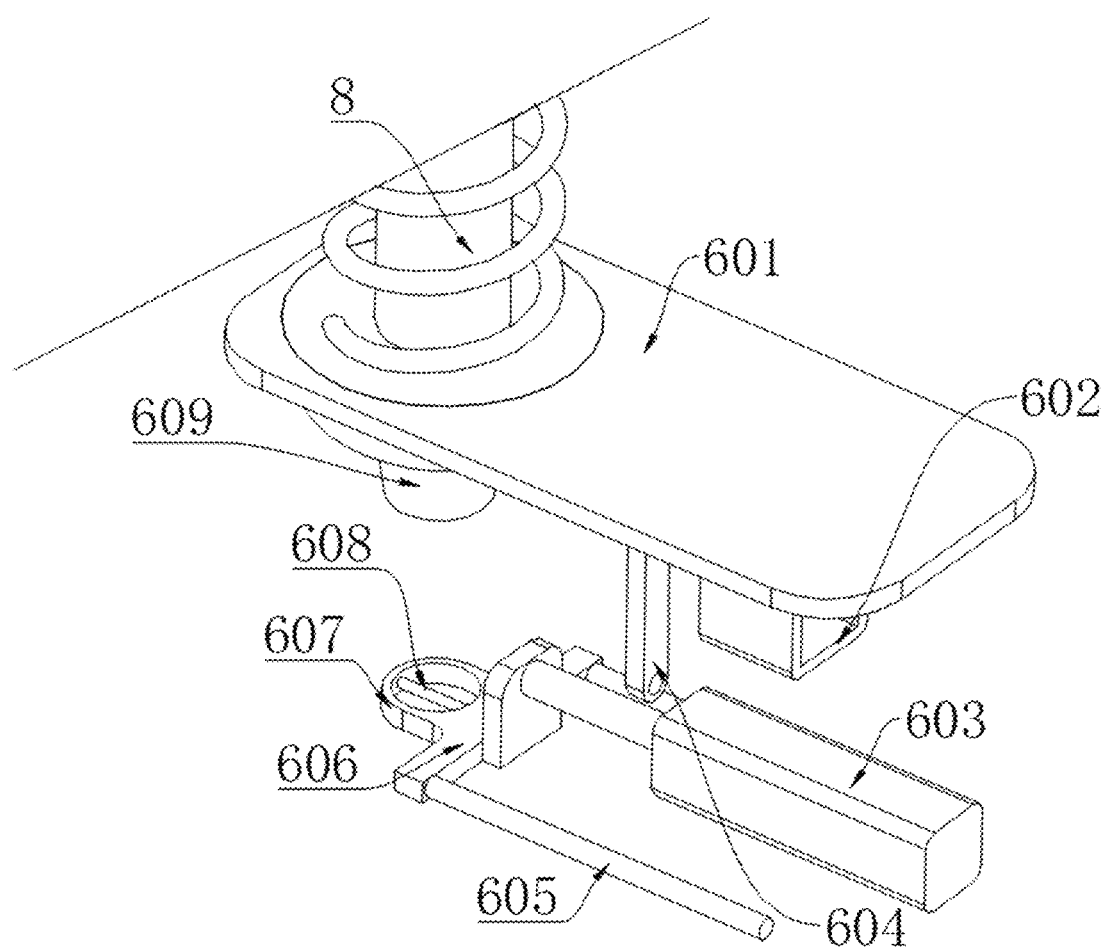
FIG. 6 is a schematic diagram of a disassembly structure of a segmentation mechanism of a continuous fiber curing extrusion device based on additive manufacturing ceramic composites according to the present invention.

With reference to FIG. 6, in a preferred embodiment, the segmentation mechanism 6 includes an extrusion port 609, a bottom end of the extrusion port 609 is movably attached to a support ring 607, a center position of the support ring 607 is fixedly connected to a segmentation rod 608, and one side of the support ring 607 is fixedly connected to a bracket 606.

With reference to FIG. 6, in a preferred embodiment, a plurality of second limit insertion rods 605 and a cylinder 603 are fixedly connected to an outer wall of a same side of the bracket 606, a third support plate 601 is fixedly connected to an outer wall of the extrusion port 609, and a mounting rack 602 is fixedly connected to a bottom outer wall of the third support plate 601.

With reference to FIG. 6, in a preferred embodiment, a plurality of second limit insertion plates 604 are fixedly connected to the bottom outer wall of the third support plate 601, the second limit insertion rods 605 are movably inserted into the second limit insertion plates 604 respectively, and the cylinder 603 is fixedly connected into the mounting rack 602. The segmentation mechanism 6 is attached to the bottom end of the extrusion port 609, and the segmentation rod 608 spans the bottom end of the extrusion port 609, whereby the extension and retraction of the cylinder 603 and the limit of the second limit insertion rods 605 can drive the support ring 607 to disengage from or engage with the bottom end of the extrusion port 609. When the ceramic flux extrusion gun 8 extrudes the ceramic flux, a straight groove is formed at a top of the extruded material in the presence of the segmentation rod 608 during additive manufacturing. When fibers are extruded from the fiber flux storage bin 3 along the straight groove, the fiber mesh is attached to the top of the extruded ceramic flux. When the fiber mesh is covered with the next layer of ceramic flux, the straight groove can assist the fiber mesh in falling down and bonding better with the ceramic flux layer.

Figure 4:
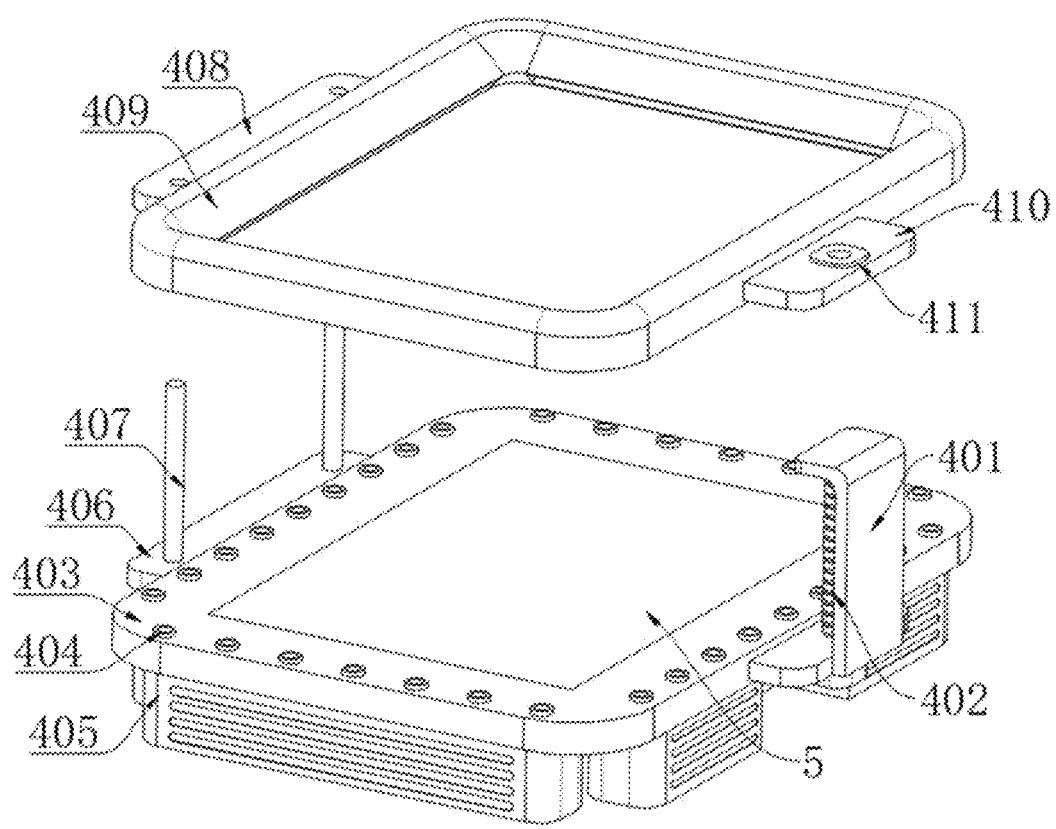
FIG. 4 is a schematic diagram of a disassembly structure of a cooling mechanism of a continuous fiber curing extrusion device based on additive manufacturing ceramic composites according to the present invention.
Figure 5:
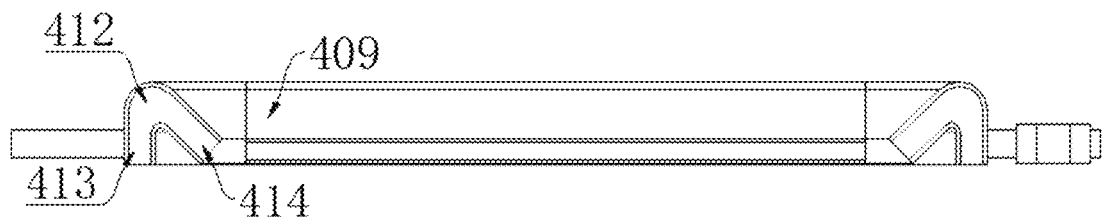
FIG. 5 is a cross-sectional view of a cooling mechanism of a continuous fiber curing extrusion device based on additive manufacturing ceramic composites according to the present invention.

With reference to FIG. 3 and FIG. 4, in a preferred embodiment, the cooling mechanism 4 includes a frame 403, the frame 403 surrounds and is fixed to an outer wall of the base 5, and a plurality of jet ports 404 penetrate a top end of the frame 403 at equidistant intervals.

With reference to FIG. 3 and FIG. 4, in a preferred embodiment, a plurality of jets 405 are fixedly connected to a bottom end of the frame 403, output ends of the jets 405 are connected to the plurality of jet ports 404 respectively, and a first support plate 406 and a bearing bracket 401 are fixedly connected to two opposite outer walls of the frame 403 respectively.

With reference to FIG. 3 and FIG. 4, in a preferred embodiment, a plurality of first limit insertion rods 407 are fixed to a top end of the first support plate 406, a screw 402 is connected into the bearing bracket 401, and a bottom end of the screw 402 is connected to a step motor.

With reference to FIG. 3 and FIG. 4, in a preferred embodiment, an annular guide bracket 409 is provided at the top of the frame 403, a first limit insertion plate 408 and a second support plate 410 are fixedly connected to two opposite outer walls of the annular guide bracket 409 respectively, a nut 411 is mounted at a center position of the second support plate 410, the nut 411 is engaged outside the screw 402, and the first limit insertion rods 407 are movably inserted into the first limit insertion plate 408.

With reference to FIG. 3 and FIG. 4, in a preferred embodiment, the annular guide bracket 409 includes a bend 412, two ends of the bend 412 are provided with an air inlet 413 and an air outlet 414 respectively, and the air inlet 413 corresponds to the plurality of jet ports 404. The cooling mechanism 4 can drive the annular guide bracket 409 to move upward according to a real-time manufacturing height through the rotation of the screw 402. Meanwhile, the jets 405 jet air upward, the air is compressed through the jet ports 404 and enters the annular guide bracket 409 from the air inlet 413, and then the air is guided by the bend 412 and discharged from the air outlet 414 to act on an outer surface of a manufactured workpiece for auxiliary cooling. Compared with direct blowing of air for cooling, this structure can avoid damage to an outer wall of the workpiece and ensure the stability of a bottom structure of the workpiece through real-time cooling during additive manufacturing.

Working principle: The two fiber flux extrusion guns are arranged with vertical operating paths and placed in an area separately from the ceramic flux extrusion gun 8 used for extruding a ceramic flux, the second transverse guide rail 17 drives the base 5 to switch between two areas, and the first transverse guide rail 15 and the longitudinal guide rail 16 drive the base 5 to assist in the extrusion of the fiber flux or ceramic flux. Therefore, by planning an operating path, a layer-by-layer stacked fiber mesh can be formed on ceramic flux layers through longitudinal and transverse alternate extrusion of fibers after each layer of ceramic flux is stacked, and the fiber mesh is further covered with a ceramic flux layer to form a ceramic matrix composite, which can enhance the stability and toughness of fiber layers in the ceramic matrix composite and effectively improve the extrusion efficiency of fibers compared with fibers extruded with a single fiber flux extrusion gun. The segmentation mechanism 6 is attached to the bottom end of the extrusion port 609, and the segmentation rod 608 spans the bottom end of the extrusion port 609, whereby the extension and retraction of the cylinder 603 and the limit of the second limit insertion rods 605 can drive the support ring 607 to disengage from or engage with the bottom end of the extrusion port 609. When the ceramic flux extrusion gun 8 extrudes the ceramic flux, a straight groove is formed at the top of the extruded material in the presence of the segmentation rod 608 during additive manufacturing. When fibers are extruded from the fiber flux storage bin 3 along the straight groove, the fiber mesh is attached to the top of the extruded ceramic flux. When the fiber mesh is covered with the next layer of ceramic flux, the straight groove can assist the fiber mesh in falling down and bonding better with the ceramic flux layer. Meanwhile, the cooling mechanism 4 can drive the annular guide bracket 409 to move upward according to the real-time manufacturing height through the rotation of the screw 402, the jets 405 jet air upward, the air is compressed through the jet ports 404 and enters the annular guide bracket 409 from the air inlet 413, and then the air is guided by the bend 412 and discharged from the air outlet 414 to act on an outer surface of a manufactured workpiece for auxiliary cooling. Compared with direct blowing of air for cooling, this structure can avoid damage to an outer wall of the workpiece and ensure the stability of a bottom structure of the workpiece through real-time cooling during additive manufacturing.

The technical means disclosed in the solutions of the present invention are not limited to the technical means disclosed in the foregoing embodiments, but also include technical solutions formed by any combination of the above technical features.

What is claimed is:

1. A continuous fiber curing extrusion device based on additive manufacturing ceramic composites, comprising a main support frame, wherein a top inner wall of the main support frame is simultaneously mounted with a first guide rail, a second guide rail and a third guide rail, wherein the first guide rail is parallel to the second guide rail, the second guide rail is perpendicular to the third guide rail, a ceramic flux extrusion gun is movably connected to the first guide rail, and a bottom end of the ceramic flux extrusion gun is provided with a segmentation mechanism; an end of the ceramic flux extrusion gun is connected to a ceramic flux storage bin through a first connecting pipe, and a first fiber flux extrusion gun and a second fiber flux extrusion gun are movably connected to the second guide rail and the third guide rail and simultaneously connected to a fiber flux storage bin through second connecting pipes respectively; and a second transverse guide rail is fixed to a bottom inner wall of the main support frame, a longitudinal guide rail is movably connected to the second transverse guide rail, a first transverse guide rail is movably connected to the longitudinal guide rail, a base is movably connected to the first transverse guide rail, and a cooling mechanism is arranged around an outer side of the base; and wherein the segmentation mechanism comprises an extrusion port, a bottom end of the extrusion port is movably attached to a support ring, a center position of the support ring is fixedly connected to a segmentation rod, and a side of the support ring is fixedly connected to a bracket.

2. The continuous fiber curing extrusion device based on the additive manufacturing ceramic composites according to claim 1, wherein a plurality of second limit insertion rods and a cylinder are fixedly connected to an outer wall of a same side of the bracket, a third support plate is fixedly connected to an outer wall of the extrusion port, and a mounting rack is fixedly connected to a bottom outer wall of the third support plate.

3. The continuous fiber curing extrusion device based on the additive manufacturing ceramic composites according to claim 2, wherein a plurality of second limit insertion plates are fixedly connected to the bottom outer wall of the third support plate, the plurality of second limit insertion rods are movably inserted into the plurality of second limit insertion plates respectively, and the cylinder is fixedly connected into the mounting rack.

4. The continuous fiber curing extrusion device based on the additive manufacturing ceramic composites according to claim 1, wherein the cooling mechanism comprises a frame, the frame surrounds and is fixed to an outer wall of the base, and a plurality of jet ports penetrate a top end of the frame at equidistant intervals.

5. The continuous fiber curing extrusion device based on the additive manufacturing ceramic composites according to claim 4, wherein a plurality of jets are fixedly connected to a bottom end of the frame, output ends of the plurality of jets are connected to the plurality of jet ports respectively, and a first support plate and a bearing bracket are fixedly connected to two opposite outer walls of the frame respectively.

6. The continuous fiber curing extrusion device based on the additive manufacturing ceramic composites according to claim 5, wherein a plurality of first limit insertion rods are fixed to a top end of the first support plate, a screw is connected into the bearing bracket, and a bottom end of the screw is connected to a step motor.

7. The continuous fiber curing extrusion device based on the additive manufacturing ceramic composites according to claim 6, wherein an annular guide bracket is provided at the top end of the frame, a first limit insertion plate and a second support plate are fixedly connected to two opposite outer walls of the annular guide bracket respectively, a nut is mounted at a center position of the second support plate, the nut is engaged outside the screw, and the plurality of first limit insertion rods are movably inserted into the first limit insertion plate.

8. The continuous fiber curing extrusion device based on the additive manufacturing ceramic composites according to claim 7, wherein the annular guide bracket comprises a bend, two ends of the bend are provided with an air inlet and an air outlet respectively, and the air inlet corresponds to the plurality of jet ports.

* * * * *